United States Patent
Shinohara (10) Patent No.: US 9,998,617 B2
(45) Date of Patent: Jun. 12, 2018

(54) CONTROL PROGRAM FOR PROVIDING AUTOMATIC NOTIFICATIONS REGARDING SETTING CHANGE EVENTS

(71) Applicant: SEIKO EPSON CORPORATION, Tokyo (JP)

(72) Inventor: Daisuke Shinohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/409,096

(22) Filed: Jan. 18, 2017

(65) Prior Publication Data

US 2017/0208193 A1 Jul. 20, 2017

(30) Foreign Application Priority Data

Jan. 20, 2016 (JP) .................... 2016-008516

(51) Int. Cl.
*G06F 3/12* (2006.01)
*H04N 1/00* (2006.01)
*G06K 15/00* (2006.01)

(52) U.S. Cl.
CPC ....... *H04N 1/00458* (2013.01); *G06F 3/1205* (2013.01); *G06F 3/1255* (2013.01); *H04N 1/00395* (2013.01); *H04N 1/00411* (2013.01); *H04N 1/00432* (2013.01); *H04N 2201/0081* (2013.01); *H04N 2201/0082* (2013.01)

(58) Field of Classification Search
CPC ........... H04N 1/00458; H04N 1/00395; H04N 1/00411; H04N 1/00432; H04N 2201/0081; H04N 2201/0082; G06F 3/122; G06F 3/1205; G06F 3/1208; G06F 3/1244; G06F 3/1254; G06F 3/1255; G06F 3/1288
USPC .................................. 358/1.1–1.18
See application file for complete search history.

(56) References Cited

U.S. PATENT DOCUMENTS

| | | | |
|---|---|---|---|
| 2005/0286100 A1* | 12/2005 | Uotani | G06F 3/1205 358/527 |
| 2009/0268237 A1* | 10/2009 | Miyata | H04N 1/00962 358/1.15 |
| 2012/0224207 A1 | 9/2012 | Sueshige | |

FOREIGN PATENT DOCUMENTS

JP 2012-181762 A 9/2012

* cited by examiner

*Primary Examiner* — Gabriel Garcia
(74) *Attorney, Agent, or Firm* — Workman Nydegger (57) ABSTRACT

An electronic apparatus is provided in which, upon reception of a change of a setting value of a first setting item on a first setting page, if incompatibility occurs between a setting value of the first setting item on the first setting page and a setting value of a second setting item on a second setting page, which is the second setting item not currently included in a display immediately after switching to the second setting page, the second setting item is displayed on a display unit immediately after the switching to the second setting page.

8 Claims, 5 Drawing Sheets

| SETTING ITEMS | SETTING DETAILS |
|---|---|
| DOUBLE-SIDED PRINTING | SINGLE-SIDE TO SINGLE-SIDE |
| SHEET TYPE | PHOTOGRAPH PAPER |
| FEEDING METHOD | LOWER TRAY |

FIG. 4B

| TRAY | SHEET TYPE |
|---|---|
| UPPER TRAY | REGULAR PAPER |
| LOWER TRAY | PHOTOGRAPH PAPER |

FIG. 4C

| SETTING ITEMS | SETTING DETAILS |
|---|---|
| DOUBLE-SIDED PRINTING | SINGLE-SIDE TO DOUBLE-SIDED |
| SHEET TYPE | REGULAR PAPER |
| FEEDING METHOD | LOWER TRAY |

CONTROL PROGRAM FOR PROVIDING AUTOMATIC NOTIFICATIONS REGARDING SETTING CHANGE EVENTS

The present application claims priority to Japanese Patent Application No. 2016-008516, filed, Jan. 20, 2016, which is hereby incorporated by reference in its entirety.

BACKGROUND

1. Technical Field

The present invention relates to an electronic apparatus and a control program thereof.

2. Related Art

In a related art, when a user performs various settings to a printer, the user is encouraged to perform reset if incompatibility occurs among setting values of a plurality of setting items (for example, see JP-A-2012-181762).

SUMMARY

However, it takes time and effort that the user finds setting items of resetting target from among a plurality of setting items on a settings screen. An advantage of some aspects of the invention is to improve usability of an electronic apparatus.

According to an aspect of the invention, an electronic apparatus includes a display unit, an operation input unit with which a user inputs an operation, and a control unit configured to cause the display unit to display a first setting page and a second setting page in a switchable manner, and to cause the input operation to be received. Upon reception of a change of a setting value of a first setting item on the first setting page, if incompatibility occurs between the setting value of the first setting item on the first setting page and a setting value of a second setting item, which is on the second setting page, and which is not currently included in a display area of the second setting page, the control unit causes the display unit to display the second setting page on which the second setting item is disposed in the display area.

In the invention, if incompatibility occurs between the setting value of the first setting item on the first setting page and the current setting value of the second setting item on the second setting page when the user changes the setting value of the first setting item on the first setting page, the user can find the second setting item promptly on the second setting page. This is because, the second setting item is not currently a display target on the second setting page until the setting value of the first setting item is changed, but the second setting item automatically becomes the display target on the second setting page when the setting value of the first setting item on the first setting page is changed and incompatibility occurs between the setting value of the first setting item and the setting value of the second setting item. Therefore, the user does not need to perform operation to change a display range, such as scrolling, to find the second setting item on the second setting page. Therefore, time and effort of the user can be reduced as compared with a related art configuration, and usability during setting of the electronic apparatus can be improved. The setting item currently included in the display area of the setting item on the second setting page may be determined fixedly in advance, or may be an item (a predetermined item in an initial state (a default state)) included in the display area immediately before finishing the display of the second setting page the last time. In any case, the second setting item is not included in the current display area as it is, but is included in the display area according to the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the drawings, related components are denoted by the same reference numerals and are not described repeatedly.

1. First Embodiment

1-1. Configuration of Printer

Figure 1:
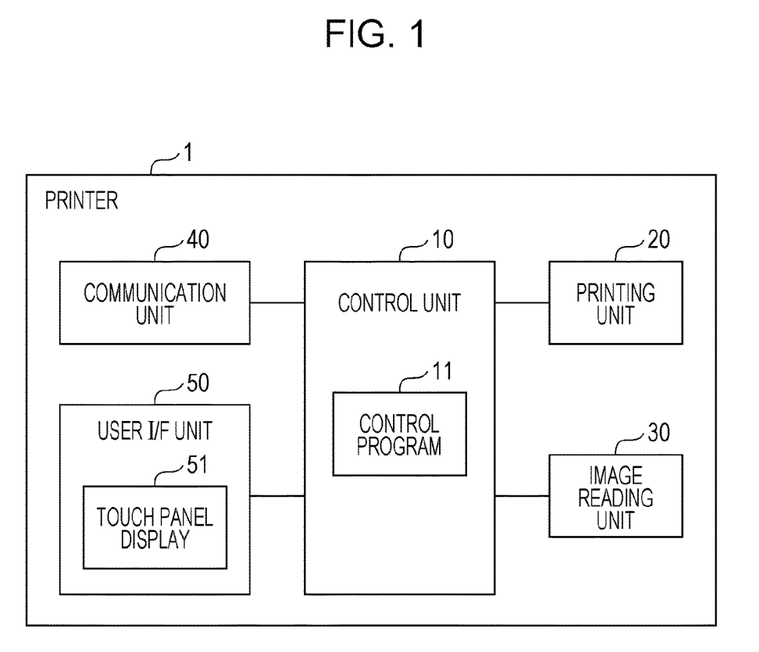
FIG. 1 is a block diagram illustrating a configuration of a printer.

FIG. 1 is a block diagram illustrating a configuration of a printer 1 according to an embodiment of the invention. The printer 1 includes a control unit 10, a printing unit 20, an image reading unit 30, a communication unit 40, and a user I/F unit 50, and is constituted as a printer with an image reading function.

The printing unit 20 includes an actuator, a sensor, a driving circuit and machine parts for performing printing on a printing medium, such as photograph paper, regular paper, and an OHP sheet, by a well-known printing method, such as an ink jet printing method and an electrophotographic printing method. The printing unit 20 includes feed trays (an upper tray and a lower tray) on which printing media before printing are placed. The image reading unit 30 includes a well-known color image sensor which emits light on an original document placed on a document table and decomposes reflected light from the original document into colors of R, G and B to generate scanned image data, an actuator which transports the original document, a driving circuit, and machine parts.

The communication unit 40 includes various communication interfaces for communicating with external apparatuses in a wired or wireless manner. The communication unit 40 includes an interface for communicating with various types of removable memory mounted on the printer 1. The user I/F unit 50 includes a touch panel display 51 (hereinafter, referred to as "display 51") and an unillustrated key input unit. The display 51 includes a display panel which displays various types of information under the control of the control unit 10, and a touch detection panel overlaid on the display panel. The display 51 detects a touch operation by a pointing object, such as a human finger, by a well-known method, such as a capacitive sensing method, a resistance film method, and an optical method. The display 51 outputs information indicating the touch operation (for example, coordinates of a touch start position and a touch end position) to the control unit 10. The display 51 corresponds to a display unit and an operation input unit.

The control unit 10 includes an unillustrated CPU, ROM, RAM, and nonvolatile memory. The CPU may execute a control program 11 recorded on the ROM or the nonvolatile memory using the RAM or the nonvolatile memory. The control program 11 displays various types of information on the display 51, detects an operation (for example, tapping, swiping, pinching in, and pinching out) to the display 51 in accordance with information indicating the touch operation acquired from the display 51 and, upon reception of the operation, causes the printer 1 to implement a function of controlling each part of the printer 1 to perform processing corresponding to the operation. In particular, the control program 11 has a display control function of displaying a settings screen of the printer 1 and, when incompatibility occurs in setting values, automatically setting a setting item of resetting target to be a display target. A plurality of setting items are presented on the settings screen so that a user can change setting values for each setting item. Information indicating the setting values set in each setting item is recorded in the RAM or the nonvolatile memory, and the information is rewritten in accordance with a change operation of the user.

1-2. Configuration of Settings Screen

Figure 2A:
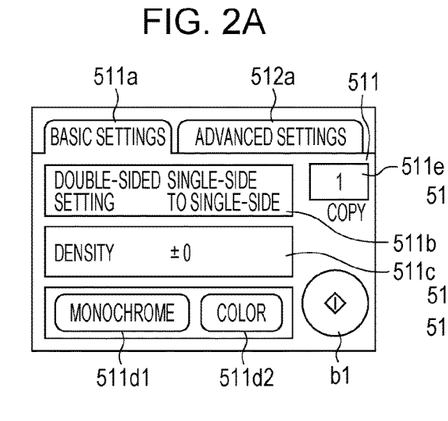
FIG. 2A illustrates a settings screen.
Figure 2B:
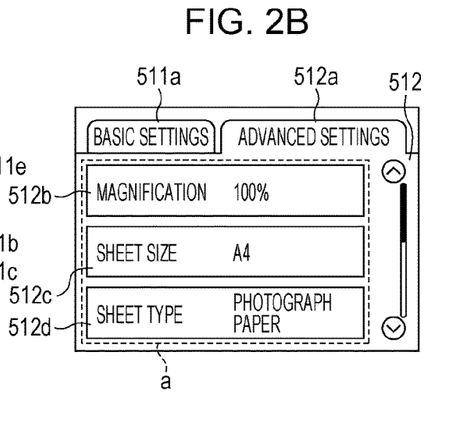
FIG. 2B illustrates a settings screen.

FIGS. 2A and 2B illustrate settings screens about a copy function of the printer 1. In the settings screen, a basic settings screen 511 (see FIG. 2A) as a first setting page and an advanced settings screen 512 (see FIG. 2B) as a second setting page are displayed in a switchable manner. The control unit 10 displays the basic settings screen 511 when detected that a basic settings tab 511*a* is tapped, and displays the advanced settings screen 512 when detected that an advanced settings tab 512*a* is tapped.

Each setting button for setting a plurality of setting items about the copy function is displayed on either one of the basic settings screen 511 or the advanced settings screen 512. On the basic settings screen 511, setting buttons of setting items that are changed highly frequently in the copy function are displayed. On the advanced settings screen 512, setting buttons of the rest of setting items that are not displayed on the basic settings screen 511 (items of the advanced settings which are changed less highly frequently than those of the basic settings screen 511) are displayed.

On the basic settings screen 511, a double-sided setting button 511*b*, a density setting button 511*c*, a color setting button 511*d*, a number of print copies setting portion 511*e*, and a start button b1 are included. The double-sided setting button 511*b* is used to set setting items about double-sided printing, and has a function of presenting currently set setting values and a function of receiving a request of a change in settings. Specifically, characters of "double-sided setting" as a setting item name and characters of "single-side to single-side" as a currently set setting values are displayed on the double-sided setting button 511*b*. When the control unit 10 detects that the double-sided setting button 511*b* is tapped, the control unit 10 presents a button indicating options (for example, "single-side to double-sided" and "single-side to single-side") of the setting values of the setting items about double-sided printing. When the control unit 10 detects that any of the buttons indicating options is tapped, the control unit 10 records the option in the RAM as a setting value of the setting item about double-sided printing. Then the control unit 10 finishes presentation of the buttons indicating the options and updates characters indicating the currently set setting values, so as to display characters indicating newly set setting values on the double-sided setting button 511*b*.

The density setting button 511*c* is used to set setting items about printing density, and has a function of presenting currently set setting values, and a function of receiving a request of a change in settings. A monochrome button 511*d*1 and a color button 511*d*2 are used in setting setting items about color printing and in selecting either color or monochrome printing. The selected button is highlighted among unselected buttons. The number of print copies setting portion 511*e* is a numerical text box for setting the number of print copies.

Figure 2C:
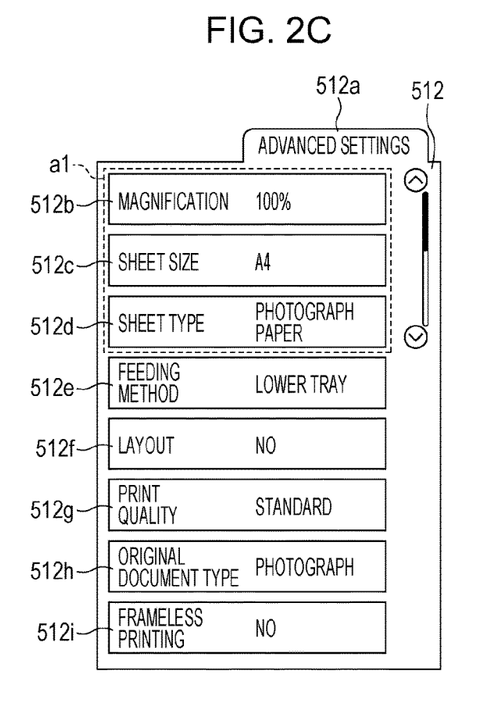
FIG. 2C illustrates a settings screen.

FIG. 2C schematically illustrates contents displayed on the advanced settings screen 512. On the advanced settings screen 512, as illustrated in FIG. 2C, a magnification setting button 512*b*, a sheet size setting button 512*c*, a sheet type setting button 512*d*, a feeding method setting button 512*e*, a layout setting button 512*f*, a print quality setting button 512*g*, an original document type setting button 512*h*, and a frameless print setting button 512*i* may be displayed. These setting buttons are not displayed at the same time on the advanced settings screen 512 (that is, not all the setting buttons are displayed all the time), some of the setting buttons are displayed in a display area for displaying a list of the setting buttons on the advanced settings screen 512. Setting buttons included in a display target area al are displayed in the display area a. The advanced settings screen 512 illustrated in FIG. 2B represents that the setting buttons included in the display target area al are displayed in the display area a when the display target area al is at the position illustrated in FIG. 2C. For example, when the control unit 10 detects that the user swipes in a direction in which the setting buttons are arranged in the display area a, the control unit 10 relatively moves the display target area al with respect to the list of the setting buttons in response to the swiping. Therefore, a list of the setting buttons is displayed by scrolling in the display area a. Each of the setting buttons 512*b* to 512*i* of the setting items assigned to be displayed on the advanced settings screen 512 has a function of presenting the currently set setting value and a function of receiving a request of a change in setting.

The sheet type setting button 512*d* is used to set setting items about the sheet type. The sheet type is the type of a printing medium (a recording medium) and may be "regular paper," "photograph paper," and so on. The original document type setting button 512*h* is used to set setting items about the original document type. The original document type is the type of contents included in the original document of an original copy, and may be "photograph," "characters," and so on.

The start button b1 receives a start instruction of a copy process based on the setting values of each setting item described above. When the control unit 10 detects that the start button b1 is tapped, the control unit 10 controls the image reading unit 30, the printing unit 20, and the communication unit 40 to perform the copy process.

1-3. Display Control Process Upon Startup of Advanced Settings Screen

Figure 3:
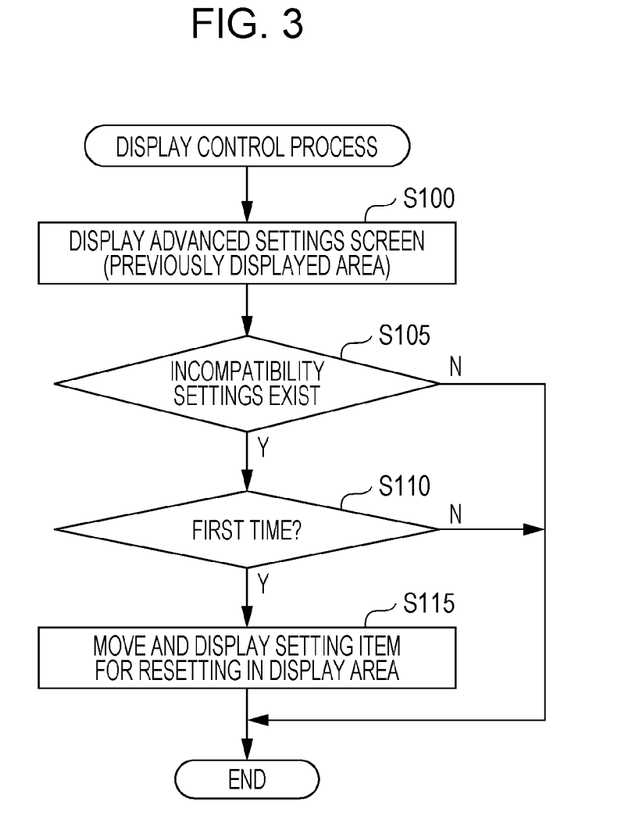
FIG. 3 is a flowchart illustrating a display control process.

Next, a display control process upon switching to the advanced settings screen 512 from the basic settings screen 511 will be described. FIG. 3 is a flowchart illustrating a flow of the display control process upon startup of the advanced settings screen 512 after the control unit 10 detects that the advanced settings tab 512*a* is tapped while the basic settings screen 511 is displayed. After the display control process illustrated in FIG. 3 is finished, the control unit 10 can change the setting values in accordance with, for example, tapping on the setting buttons of the advanced settings screen 512. After the display control process illustrated in FIG. 3 is finished, the control unit 10 can move the display target area a1 in accordance with the swiping by the user on the advanced settings screen 512, and can display a group of the setting buttons by scrolling in the display area a.

Return to the description of the display control process upon startup of the advanced settings screen 512 illustrated in FIG. 3. When the control unit 10 detects that the advanced settings tab 512a is tapped while the basic settings screen 511 is displayed, the control unit 10 performs the display control process illustrated in FIG. 3. First, the control unit 10 displays the advanced settings screen 512 (step S100). In step S100, the setting buttons displayed in the display area a immediately before changing to another screen when the advanced settings screen 512 was displayed the last time (that is, the setting buttons included in the display target area a1) are disposed in the display area a.

Then, the control unit 10 determines whether incompatibility occurs among the settings (step S105). If no incompatibility occurs (N in step S105), the control unit 10 finishes the display control process upon startup of the advanced settings screen 512. An "incompatible state" is a state in which setting values that cannot be set simultaneously are set in two or more setting items.

If it is determined that incompatibility occurs among the settings in step S105 (Y in step S105), the control unit 10 determines whether the advanced settings screen 512 is displayed for the first time after incompatibility occurs (step S110). If it is determined that the advanced settings screen 512 is displayed for the first time (Y in step S110), the control unit 10 moves and displays, to and on the display area, setting items of resetting target for encouraging resetting a in order to eliminate the incompatibility (step Specifically, the control unit 10 moves the display target area a1 relatively to the list of setting buttons to the position including the setting buttons of the setting items of resetting target, whereby the list of setting buttons is scrolled in the display area a and the setting buttons of resetting target are disposed in the display area a. If it is determined that the advanced settings screen 512 is displayed not for the first time in step S110 (N in step S110), the display control process is finished. The control unit 10 may control a first flag in the following manner, for example, for the determination whether the advanced settings screen 512 is displayed for the first time. Specifically, the control unit 10 sets the first flag ON before starting the display control process for the first time after incompatibility occurs. In step S110, whether the first flag is ON is determined. If the first flag is ON, the process proceeds to step S115 and, if the first flag is OFF, the display control process is finished. The control unit 10 sets the first flag OFF in step S115. The control unit 10 sets the first flag OFF also when no incompatibility occurs (if incompatibility is eliminated).

Figure 4A:
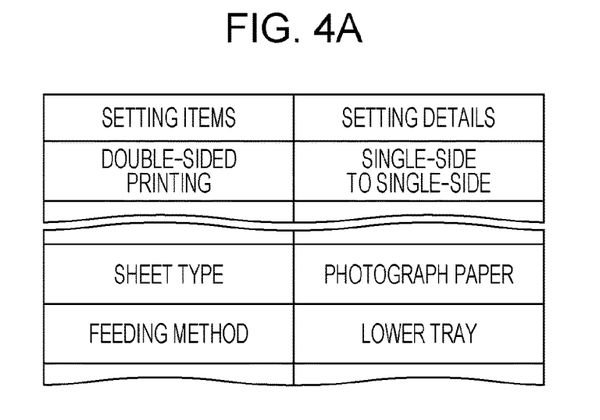
FIG. 4A illustrates setting values.
Figure 4B:
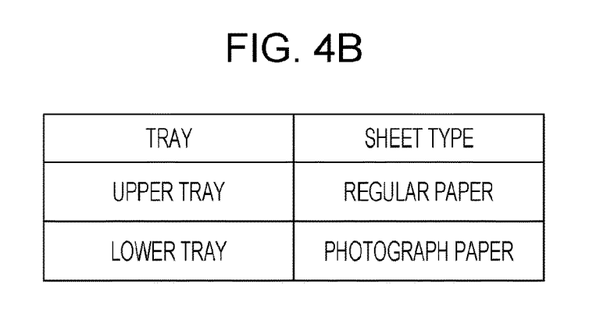
FIG. 4B illustrates setting values.

Next, an example in which a determination result is N in step S105 (no incompatibility occurs in settings) will be described. Setting items related to the example and the current conditions of setting values thereof are illustrated in FIG. 4A. Currently, "single-side to single-side" is set as a selected content in the setting item about the double-sided printing (which corresponds to the first setting item), "photograph paper" is set as a setting value in the setting item about the sheet type, and "lower tray" is set as a setting value in the setting item about the feeding method (which corresponds to the second setting item). As illustrated in FIG. 4B, it is recorded in the nonvolatile memory that regular paper is placed on the upper tray and that photograph paper is placed on the lower tray in the two feed trays provided in the printer 1. Since the currently set setting values can be set simultaneously in the three setting items illustrated in FIG. 4A, and photograph paper is placed on the lower tray set as the feeding method as illustrated in FIG. 4B, no incompatibility occurs in this state.

FIG. 2A illustrates a basic settings screen 511 in a state in which the contents illustrated in FIGS. 4A and 4B are set. When the control unit 10 detects that the advanced settings tab 512a is tapped while the basic settings screen 511 illustrated in FIG. 2A is displayed, the control unit 10 displays the advanced settings screen 512 illustrated in FIG. 2B. The display target area a1 is located at a position including a setting button (here, the magnification setting button 512b) in the top of the list of the setting buttons in default setting. FIG. 2B illustrates an example in which the display target area a1 is in the default setting. In the default setting, the magnification setting button 512b, the sheet size setting button 512c, and the sheet type setting button 512d are displayed in the display area a, and setting buttons of the feeding method setting button 512e and below are not displayed (these buttons are displayed when the user swipes to scroll).

In the default setting, the setting items are displayed from the top as illustrated in FIG. 2B. If the user swipes on the advanced settings screen 512 to change the setting items to be displayed, the control unit 10 records, on the RAM, the position of the display target area a1 relative to the list of the setting buttons immediately before the finish of the display of the advanced settings screen 512 and change to another screen. The control unit 10 displays the setting items included in the display target area a1 when the basic settings screen 511 is changed to the advanced settings screen 512 next time.

Next, an example will be described in which it is determined that incompatibility occurs in step S105 and it is determined that the advanced settings screen 512 is displayed for the first time in step S110. For example, in the condition that contents illustrated in FIGS. 4A and 4B are set, if the user operates the double-sided setting button 511b to change the setting value into "single-side to double-sided" on the basic settings screen 511, since no double-sided printing can be performed on the photograph paper, incompatibility occurs between the setting value of the setting item about double-sided printing and the setting value of the setting item about the sheet type. Therefore, the control unit 10 automatically changes the setting values about the setting items of which setting values can be automatically changed in order to eliminate incompatibility. Regarding setting items of which setting values cannot be automatically changed, the control unit 10 does not change the setting values and encourages the user to change the setting values by the user. The automatically changeable setting items can be automatically changed by the printer 1 because the user has no choice, and the automatically unchangeable setting items cannot be automatically changed by the printer 1 because the user has choices.

Figure 4C:
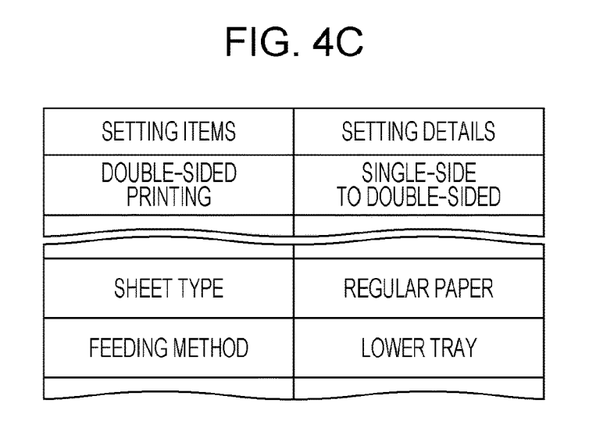
FIG. 4C illustrates setting values.

Specifically, the control unit 10 automatically changes the setting value of the setting item about the sheet type to "regular paper" from "photograph paper" as illustrated in FIG. 4C. Here, the user may be notified of having automatically changed the setting value of the setting item about the sheet type into "regular paper" from "photograph paper." Since it is considered that photograph paper is still placed on the lower tray even if the sheet type is automatically changed to "regular paper" from "photograph paper", either of the following operations needs to be performed: changing the setting value of the setting item about the feeding method into "upper tray" on which regular paper is placed from "lower tray" on which photograph paper is placed, or replacing the printing paper currently placed on the lower tray to regular paper from photograph paper without changing the setting value of the setting item about the feeding method from "lower tray." Since the printer 1 cannot determine which choice the user prefers, the control unit 10 does not automatically change the setting value of the setting item about the feeding method. Instead of the automatic change, the control unit 10 encourages the user to reset the setting item about the feeding method in the following manner.

Figure 5A:
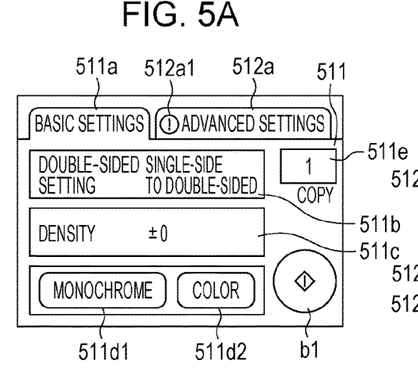
FIG. 5A illustrates a settings screen.

FIG. 5A illustrates the basic settings screen 511 immediately after changing the setting value of the setting item about the double-sided printing to "single-side to double-sided" from "single-side to single-side" while the basic settings screen 511 illustrated in FIG. 2A is displayed. When the setting value of the setting item about the double-sided printing is changed to "single-side to double-sided" from "single-side to single-side," the control unit 10 displays, on the advanced settings tab 512*a*, a warning sign 512*a*1 which is a sign of circled "!" indicating that the setting item which requires resetting due to incompatibility exists on the advanced settings screen 512. The warning sign 512*a*1 has also a function of encouraging the user to tap the advanced settings tab 512*a* to switch from the basic settings screen 511 to the advanced settings screen 512.

Figure 5B:
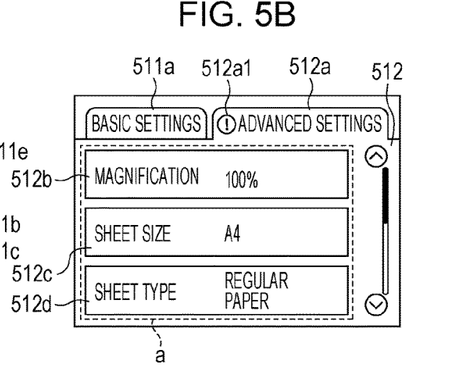
FIG. 5B illustrates a settings screen.
Figure 5C:
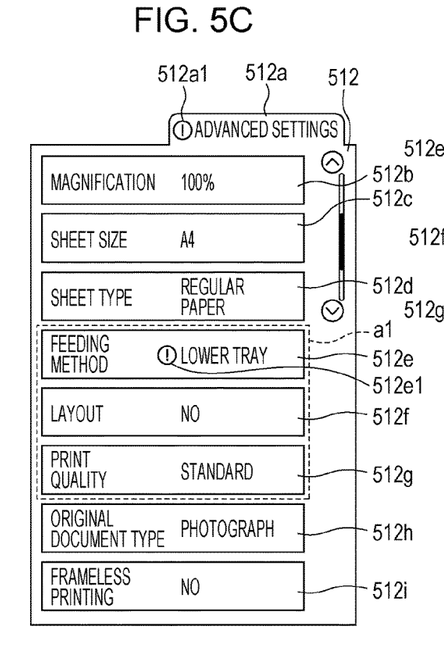
FIG. 5C illustrates a settings screen.
Figure 5D:
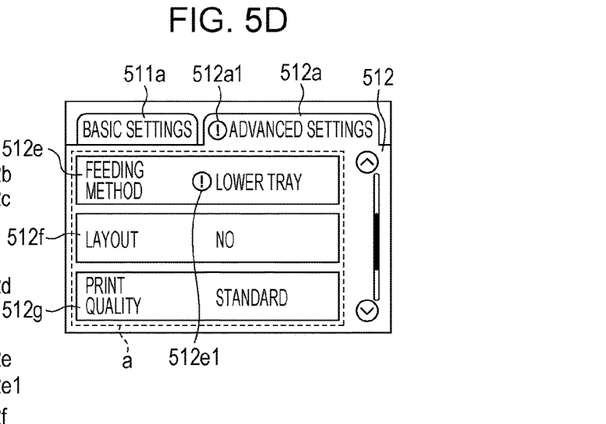
FIG. 5D illustrates a settings screen.

When the control unit 10 detects that the advanced settings tab 512*a* on which the warning sign 512*a*1 is displayed is tapped, the control unit 10 starts the display control process described above. In step S100, the control unit 10 displays the advanced settings screen 512 first. Supposing that the display target area al immediately before changing from the advanced settings screen 512 to another screen the last time is in the position illustrated in FIG. 2C. In step S100, immediately after the screen is changed from the basic settings screen 511 illustrated in FIG. 5A to the advanced settings screen 512, the magnification setting button 512*b*, the sheet size setting button 512*c*, and the sheet type setting button 512*d* which are included in the display target area al illustrated in FIG. 2C are displayed in the display area a of the advanced settings screen 512 as illustrated in FIG. 5B. Then, by moving the display target area al to the position illustrated in FIG. 5C from the position illustrated in FIG. 2C, the list of the setting buttons is scrolled in the display area a of the advanced settings screen 512. That is, the list of the setting buttons is automatically scrolled from the state illustrated in FIG. 5B to the feeding method setting button 512*e* becoming the top in the display area a as illustrated in FIG. 5D. As a result, the layout setting button 512*f* and the print quality setting button 512*g* in addition to the feeding method setting button 512*e* are displayed in the display area a. The control unit 10 displays a warning sign 512*e*1 also near the characters "lower tray" displayed on the feeding method setting button 512*e* in order to make the user recognize that reset is necessary.

Therefore, in the present embodiment, if incompatibility occurs between the setting value of the setting item assigned to the basic settings screen 511 and the setting value of the setting item assigned to the advanced settings screen 512 due to a change in setting of the setting item assigned to the basic settings screen 511, at timing at which the advanced settings screen 512 is displayed in response to the user's tapping on the advanced settings tab 512*a* for the first time after the incompatibility occurs, the list of the setting buttons is automatically scrolled so that the setting buttons which need to be reset become display targets. Therefore, the user can easily find the setting button of the setting item which needs reset. Since the setting buttons of resetting target become display target automatically and thus it is unnecessary for the user to swipe, etc. to scroll the list of the setting buttons, time and effort of the user may be reduced. By showing the process of scrolling to move the display target area al to the position illustrated in FIG. 5C from the position illustrated in FIG. 2C after changing to the advanced settings screen 512, the user is easily made to recognize the reset of the setting item about the feeding method.

If it is determined that the advanced settings screen 512 is displayed not for the first time in step S110 (i.e., if the advanced settings screen 512 is displayed for the second time or thereafter after incompatibility occurs), automatic scrolling described above is not performed. For the second time or thereafter, it is considered that the user has already known the necessity of resetting the setting item. If the above-described automatic scrolling is performed each time for the second time or thereafter as well as for the first time, usability may become worse on the contrary. Therefore, the control unit 10 performs the above-described automatic scrolling only when the advanced settings screen 512 is displayed for the first time, and if the advanced settings screen 512 is displayed for the second time or thereafter even if the incompatibility is still remained, the control unit 10 displays the setting buttons included in the display target area al displayed the last time as described in step S100. When new incompatibility occurs, automatic scrolling is performed if it is the first switching after the new incompatibility occurs even if it is a switching for the second time or thereafter with previous incompatibility still occurring.

2. Other Embodiments

The technical scope of the invention is not limited to the embodiment described above, and various changes may be made without departing from the spirit and scope of the invention. For example, in the above embodiment, when the user performs a switching operation to the second setting page after changing the setting on the first setting page with which incompatibility occurs, the second setting item which is not displayed immediately after the switching is scrolled and displayed finally in the display area a. Alternatively, the second setting item may be displayed in the display area a when the page is switched into the second setting page (i.e., the display after the scrolling may be presented from the beginning after switching, without scrolling).

In the above embodiment, an example in which, in response that the user performs a switching operation to the second setting page after changing the setting on the first setting page with which incompatibility occurs, the second setting item is displayed in the display area of the second setting page is described. However, the switching operation to the second setting page does not necessarily have to be a trigger of displaying the second setting item. For example, when a setting value with which incompatibility occurs with the setting value of the second setting item is set to the first setting item, the display may be automatically switched from the first setting page to the second setting page and the second setting item may be displayed in the display area of the second setting page. In this case, since the second setting page is displayed even if the user does not perform the switching operation to the second setting page, and the second setting item is displayed in the display area of the second setting page, time and effort of the user may further be reduced.

Although a single setting item requires resetting in the above embodiment, a plurality of setting items may require resetting. In that case, based on the predetermined priority to each setting item, the setting items with high priority among a plurality of setting items of resetting target may be displayed in the display area. In the first embodiment, the setting value of the second setting item is automatically changed when the setting value of the second setting item can be automatically changed. Here, the automatically changed setting item may be displayed in the display area. Then, the automatically changed setting item and the setting value thereof may be informed the user of.

In the above embodiment, the list of the setting buttons is scrolled to display the setting buttons of resetting target in the display area a without changing the order of the setting buttons on the second setting page. Alternatively, the setting buttons of resetting target may be disposed in the display area a by changing the order of the setting buttons of resetting target in the list of the setting buttons. Although the warning sign 512a1 displayed in the advanced settings tab 512a warns the user in the above embodiment, the user may be warned by the warning sign 512a1 displayed around the advanced settings tab 512a, a trimmed advanced settings tab 512a, or an advanced settings tab 512a different in color. These are examples of display to encourage the user to perform the switching operation in the advanced settings tab 512a which is the target of the user performing the switching operation.

The invention is applicable to various electronic apparatuses other than the printer. The function of each part described in the claim is implemented by a hardware resource of which function is specified by a configuration itself, a hardware resource of which function is specified by a program, or combination thereof. Functions of the parts are not limited to those implemented by hardware resources which are mutually physically independent.

What is claimed is:

1. An electronic apparatus, comprising:
    a display unit;
    an operation input unit with which a user inputs an operation; and
    a control unit configured to:
        cause the display unit to display a user interface that includes multiple tabs, wherein a first tab corresponds to a first setting page and a second tab corresponds to a second setting page, the first setting page and the second setting page each including one or more adjustable setting items, and wherein the first tab and second tab are displayed simultaneously with each other but only one of either the first setting page or the second setting page is displayed at a single time, the first setting page being currently displayed on the user interface;
        monitor the one or more adjustable setting items on both the first setting page and the second setting page to detect of a change to a setting value of a first setting item on the first setting page,
        determine that an incompatibility exists between the setting value of the first setting item on the first setting page and a setting value of a second setting item on the second setting page;
        cause a warning icon to be displayed on the second tab to provide a notification regarding the incompatibility on the second setting page; and
        after the second setting page is displayed on the user interface, cause the display unit to automatically navigate to the second setting item so that the second setting item is viewable on the user interface.

2. The electronic apparatus according to claim 1, wherein, when the incompatibility occurs, after identifying the change on the first setting page, in response to displaying the second setting page on the user interface, the control unit causes the display unit to display the second setting page's one or more adjustable setting items.

3. The electronic apparatus according to claim 1, wherein, automatically navigating to the second setting item includes automatically scrolling to a location of the second setting item on the second setting page.

4. The electronic apparatus according to claim 1, wherein, when the incompatibility is determined, the control unit causes the second setting page to be automatically displayed on the user interface without user input, whereby the second setting page replaces the first setting page on the user interface when the incompatibility occurs.

5. The electronic apparatus according to claim 1, wherein
    automatically navigating to the second setting item occurs only when the second setting page is displayed on the user interface for a first time after the incompatibility occurs, and
    automatically navigating to the second setting item does not occur when the second setting page is displayed on the user interface for a second time or subsequent time after the incompatibility occurs.

6. The electronic apparatus according to claim 1, wherein when the incompatibility occurs,
    if the setting value of the second setting item cannot be automatically changed, the control unit causes the setting value of the second setting item to be disposed in a display area on the second setting page without automatically causing the setting value of the second setting item to be changed and,
    if the setting value of the second setting item can be automatically changed, the control unit automatically causes the setting value of the second setting item to be changed.

7. The electronic apparatus according to claim 1, wherein when the incompatibility occurs, the control unit causes a display to be performed to encourage a user to perform a switching operation in an area of target with which the user performs the switching operation from the first setting page to the second setting page.

8. One or more hardware storage devices having stored thereon computer-executable instructions that, when executed by one or more processors of an electronic apparatus, cause the electronic apparatus to:
    display, on a display unit, a user interface that includes multiple tabs, wherein a first tab corresponds to a first setting page and a second tab corresponds to a second setting page, the first setting page and the second setting page each including one or more adjustable setting items, and wherein the first tab and the second tab are displayed simultaneously with each other but only one of either the first setting page or the second setting page is displayed at a single time, the first setting page being currently displayed on the user interface;
    monitor the one or more adjustable setting items on both the first setting page and the second setting page to detect a change to a setting value of a first setting item on the first setting page;

determine that an incompatibility exists between the setting value of the first setting item on the first setting page and a setting value of a second setting item on the second setting page;
cause a warning icon to be displayed on the second tab to provide a notification regarding the incompatibility on the second setting page; and
after the second setting page is displayed on the user interface, automatically navigate to the second setting item so that the second setting item is viewable on the user interface.

\* \* \* \* \*